(12) United States Patent
Park

(10) Patent No.: US 11,533,107 B2
(45) Date of Patent: Dec. 20, 2022

(54) SYSTEM AND METHOD OF MONITORING BASE STATION SIGNAL

(71) Applicant: SOLiD, INC., Seongnam-si (KR)

(72) Inventor: Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/092,688

(22) Filed: Nov. 9, 2020

(65) Prior Publication Data

US 2021/0143905 A1 May 13, 2021

(30) Foreign Application Priority Data

Nov. 7, 2019 (KR) .......................... 10-2019-0142052
Nov. 5, 2020 (KR) .......................... 10-2020-0147078

(51) Int. Cl.
*H04B 10/079* (2013.01)
*H04B 10/2575* (2013.01)

(52) U.S. Cl.
CPC ..... *H04B 10/079* (2013.01); *H04B 10/25753* (2013.01)

(58) Field of Classification Search
CPC .......................... H04B 10/079; H04B 10/25753
USPC .......................................................... 398/25
See application file for complete search history.

(56) References Cited

U.S. PATENT DOCUMENTS

| 10,389,441 B2* | 8/2019 | Park .................... H04J 14/0282 |
| 10,404,368 B2 | 9/2019 | Heath et al. | |
| 2002/0098838 A1* | 7/2002 | Ikeda ...................... H04B 7/022 455/67.11 |
| 2006/0223573 A1* | 10/2006 | Jalali ................. H04W 36/0085 455/552.1 |
| 2011/0008042 A1* | 1/2011 | Stewart ............... H04W 88/085 398/115 |
| 2014/0128079 A1* | 5/2014 | Soliman ............ H04W 36/0058 455/437 |
| 2014/0146693 A1* | 5/2014 | Chetlur ................. H04L 43/103 370/252 |

(Continued)

FOREIGN PATENT DOCUMENTS

| WO | 2010101001 A1 | 9/2010 | |
| WO | WO-2010101001 A1 * | 9/2010 | ........... H04B 10/071 |

OTHER PUBLICATIONS

Pham et al; High-Speed and Uninterrupted Communication for High-Speed Trains by Ultrafast WDM Fiber-Wireless Backhaul System; Jan. 2019; Journal of lightwave technology; pp. 1-13. (Year: 2019).*

(Continued)

*Primary Examiner* — Amritbir K Sandhu
(74) *Attorney, Agent, or Firm* — Sughrue Mion, PLLC

(57) ABSTRACT

Provided is a base station signal monitoring system including: a plurality of optical transmission devices configured to transmit a base station signal; a measuring device configured to measure the base station signal according to a preset method; and a switch device, which is connected to the plurality of optical transmission devices and the measuring device, configured to switch connections between a plurality of input ports and a plurality of output ports so that the base station signal is transmitted from one of the plurality of optical transmission devices to the other one of the plurality of optical transmission devices or the measuring device.

12 Claims, 5 Drawing Sheets

(56) References Cited

U.S. PATENT DOCUMENTS

| | | | |
|---|---|---|---|
| 2015/0105072 A1* | 4/2015 | Zhu | H04W 64/003 |
| | | | 455/434 |
| 2016/0065320 A1* | 3/2016 | Berlin | H04B 10/25759 |
| | | | 398/37 |
| 2018/0070246 A1 | 3/2018 | Jack et al. | |
| 2018/0234200 A1 | 8/2018 | Bottari et al. | |
| 2021/0022040 A1* | 1/2021 | Zhu | H04W 28/0268 |
| 2021/0051765 A1* | 2/2021 | Rosenschild | H04W 24/02 |
| 2021/0143905 A1* | 5/2021 | Park | H04B 10/079 |

OTHER PUBLICATIONS

Dat et al; High-Speed and Uninterrupted Communication for High-Speed Trains by Ultrafast WDM Fiber-Wireless Backhaul System; Jan. 2019; Journal of Lightwave technology; pp. 1-13. (Year: 2019).*

Noh et al; Realizing Multi-Gbps Vehicular Communication: Design, Implementation and Validation; Feb. 2019; IEEE, pp. 1-12. (Year: 2019).*

Pham et al; High-speed and Uninterrupted communication for high speed trains by Ultrafast WDM fiber-wireless backhaul system; Jan. 2019; Journal of Lightwave technology vol. 37, No. 1; pp. 1-13. (Year: 2019).*

Extended European Search Report dated Apr. 12, 2021 by the European Patent Office in application No. 20206194.1.

\* cited by examiner

400

SYSTEM AND METHOD OF MONITORING BASE STATION SIGNAL

CROSS-REFERENCE TO RELATED APPLICATION

This application claims the benefit of Korean Patent Application No. 10-2019-0142052, filed on Nov. 7, 2019, and Korean Patent Application No. 10-2020-0147078, filed on Nov. 5, 2020, in the Korean Intellectual Property Office, the disclosures of which are incorporated herein in its entirety by reference.

BACKGROUND

1. Field

The present disclosure relates to systems and methods of monitoring base station signals.

2. Description of the Related Art

A fronthaul refers to a link between a digital data processing device (e.g., digital unit (DU)) of a base station and a remote wireless signal-processing device (e.g., radio unit (RU)) in a radio access network for mobile communication.

The existing active fronthaul devices based on wavelength division multiplexing (WDM), which are used for data distribution in the fronthaul, simply perform optical-electrical-optical (OEO) conversion and 3R (reamplification, retiming, and reshaping) processing for signals coming from base station devices (DU, RU, etc.) and then transmit the signals to other devices. Therefore, in order to change the connection between a client-side signal and a WDM-side signal, an administrator needs to visit the site and release and change optical jumper code (OJC) connected to each device.

In addition, in order to measure base station signals transmitted and received through the base station devices, an administrator needs to visit the site directly and connect a measuring device to the corresponding device. For example, in order to measure base station signals transmitted and received through a base station antenna, an administrator needs to visit the site where the antenna is installed, form a tap on a cable connected to the antenna, install a splitter on the tap, and then connect a measuring device to the splitter.

SUMMARY

Provided are base station signal monitoring systems and methods capable of remotely monitoring base station signals without an administrator's visit.

Additional aspects will be set forth in part in the description which follows and, in part, will be apparent from the description, or may be learned by practice of the presented embodiments.

According to an aspect of the present disclosure, a base station signal monitoring system includes a plurality of optical transmission devices configured to transmit a base station signal; a measuring device configured to measure the base station signal according to a preset method; and a switch device, which is connected to the plurality of optical transmission devices and the measuring device, configured to switch connections between a plurality of input ports and a plurality of output ports so that the base station signal is transmitted from one of the plurality of optical transmission devices to the other one of the plurality of optical transmission devices or the measuring device.

According to an exemplary embodiment, the switch device may receive a base station signal transmission request from the measuring device, switch the connections between the plurality of input ports and the plurality of output ports to transmit at least a portion of a base station signal corresponding to the base station signal transmission request to the measuring device.

According to an exemplary embodiment, the switch device may receive a base station signal transmission request from the measuring device, duplicate at least a portion of a base station signal corresponding to the base station signal transmission request, and transmit the duplicated base station signal to the measuring device.

According to an exemplary embodiment, the base station signal monitoring system may further include a server, which is connected to the switch device, configured to transmit change information for changing a connection state between the plurality of input ports and the plurality of output ports to the switch device, wherein the switch device may control the connections between the plurality of input ports and the plurality of output ports to correspond to the change information.

According to another aspect of the present disclosure, a switch device includes a plurality of input ports respectively connected to a plurality of optical transmission devices; a plurality of output ports each connected to any one of the plurality of optical transmission devices and a measuring device; a switch configured to switch connections between the plurality of input ports and the plurality of output ports so that a base station signal is transmitted from one of the plurality of optical transmission devices to the other one of the plurality of optical transmission devices or the measuring device; and a switch controller configured to control the switch to correspond to preset connection information.

According to an exemplary embodiment, the switch device may further include a communication modem receiving a base station signal transmission request from the measuring device, wherein the switch controller may control the switch so that at least a portion of a base station signal corresponding to the base station signal transmission request is transmitted to the measuring device.

According to an exemplary embodiment, the switch device may further include a communication modem receiving a base station signal transmission request from the measuring device, wherein the switch controller duplicates at least a portion of a base station signal corresponding to the base station signal transmission request, and control at least one of the switch and the communication modem so that the duplicated portion of the base station signal is transmitted to the measuring device.

According to an exemplary embodiment, the switch device may further include a communication modem receiving change information for changing a connection state between the plurality of input ports and the plurality of output ports from a connected server, wherein the switch controller may control the switch to correspond to the change information.

According to another aspect of the present disclosure, an optical transmission device includes a plurality of signal processors respectively processing a plurality of base station signals according to a preset method; a plurality of laser modules, which are respectively connected to the plurality of signal processors, configured to respectively convert the plurality of base station signals output from the plurality of signal processors into optical signals; a switch configured to switch the connections between the plurality of signal processors and the plurality of laser modules so that each of the plurality of base station signals is input to a corresponding laser module from among the plurality of laser modules; and a switch controller configured to control the switch to correspond to preset connection information.

According to an exemplary embodiment, the optical transmission device may further include a communication modem receiving a base station signal transmission request from a connected measuring device, wherein the switch controller may control the switch so that at least a portion of a base station signal corresponding to the base station signal transmission request from among the plurality of base station signals is transmitted to the measuring device.

According to an exemplary embodiment, the optical transmission device may further include a communication modem receiving a base station signal transmission request from a connected measuring device, wherein the switch controller may duplicate at least a portion of a base station signal corresponding to the base station signal transmission request from among the plurality of base station signals, and control at least one of the switch and the communication modem so that the duplicated portion of the base station signal is transmitted to the measuring device.

According to an exemplary embodiment, the optical transmission device may further include a communication modem receiving change information for changing a connection state between the plurality of input ports and the plurality of output ports from a connected server, wherein the switch controller may control the switch to correspond to the change information.

According to the present disclosure, it is possible to provide base station signal monitoring systems and methods capable of remotely monitoring base station signals without an administrator's visit.

Effects obtainable by the embodiments of the disclosure are not limited to the effects described above, and other effects not described herein may be clearly understood by one of ordinary skill in the art to which the inventive concept belongs from the following description.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
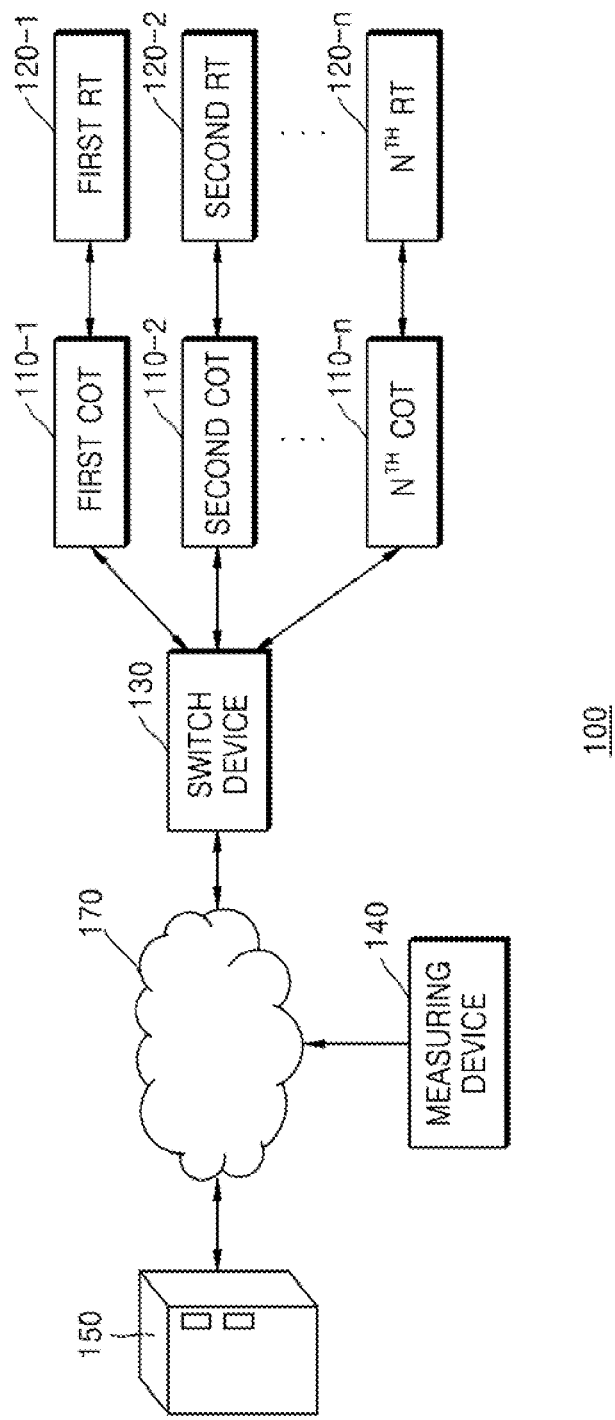
FIG. 1 is a configuration diagram of a base station signal monitoring system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may "be connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

Figure 2:
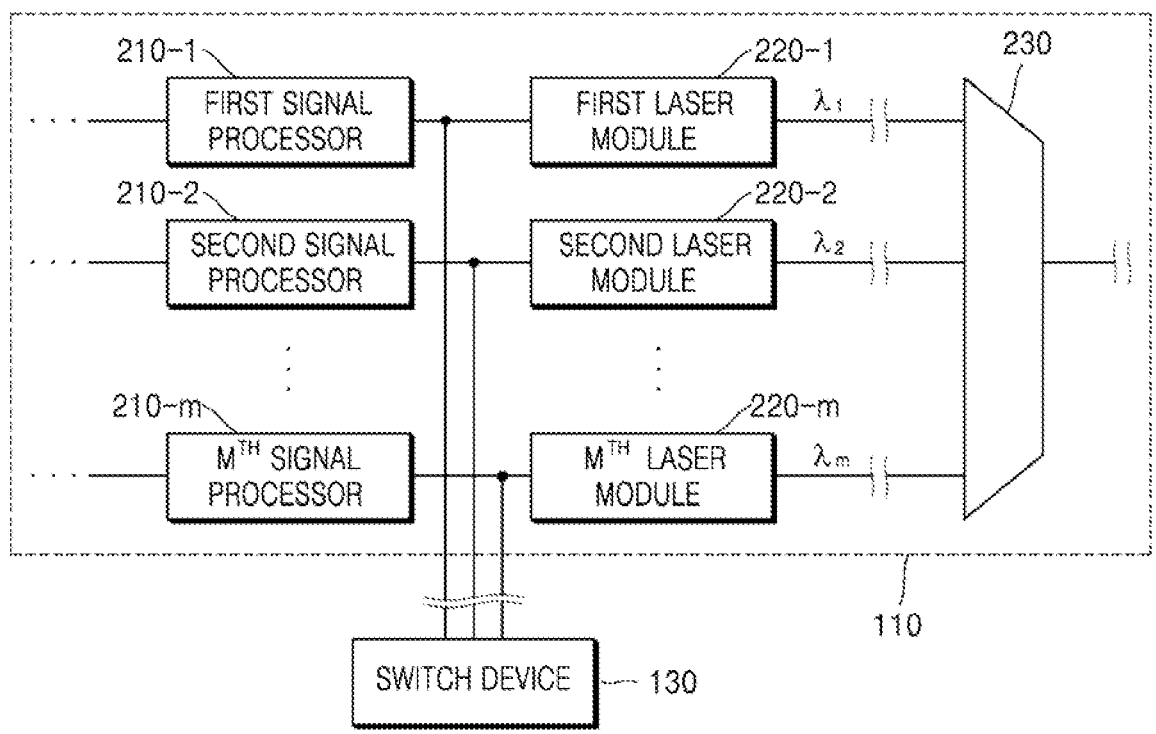
FIG. 2 is a block diagram of an optical transmission device according to an embodiment.
Figure 3:
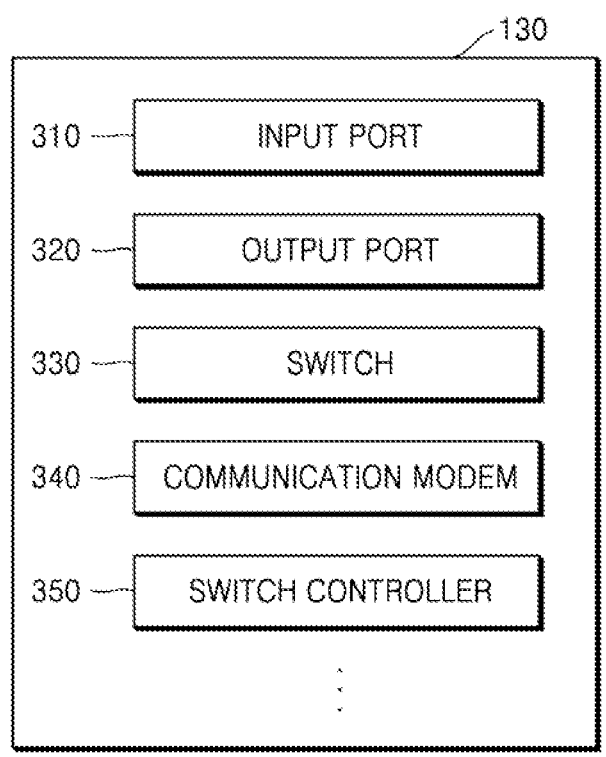
FIG. 3 is a block diagram of a switch device according to an embodiment.

FIG. 1 is a configuration diagram of a base station signal monitoring system according to an embodiment, FIG. 2 is a block diagram of an optical transmission device according to an embodiment, and FIG. 3 is a block diagram of a switch device according to an embodiment.

Referring to FIG. 1, a base station signal monitoring system 100 according to an embodiment may include n central office terminals (COTs) 110-1 to 110-*n*, n remote terminals (RTs) 120-1 to 120-*n*, a switch device 130, a measuring device 140, and a server 150 (n is a natural number). For convenience of explanation, FIG. 1 illustrates an embodiment in which the number of COTs and the number of RTs are the same, and one COT is connected to one RT, but the inventive concept of the present disclosure is not limited thereto. The number of COTs and the number of RTs, and the structure connected to each other may vary.

Each of the n COTs 110-1 to 110-*n* may be connected to at least one of the n RTs 120-1 to 120-*n*. The COT and RT, which are connected to each other, may be connected to each other through an optical cable, and an optical transmission network may be formed through the interconnection. Among the COT and RT that are connected to each other, the COT may be connected to a portion that performs digital processing of a base station in a fronthaul segment of a radio access network architecture, for example, at least one digital unit (DU) or a baseband unit (BBU), and the RT may be connected to a portion that performs wireless processing of the base station, for example, at least one radio unit (RU) or remote radio head (RRH). However, the present disclosure is not limited thereto, and among the COT and RT connected to each other, the COT may be connected to at least one macro cell RU, and the RT may be connected to at least one small cell RU. According to various fronthaul topologies of the radio access network architecture, a connection object and an interconnection structure of each of the COT and RT may vary.

The switch device 130 may be connected to the n COTs 110-1 to 110-$n$. The switch device 130 and each of then COTs 110-1 to 110-$n$ may be connected to each other by an optical cable.

The switch device 130, the measuring device 140, and the server 150 may be connected to a network 170. The network 170 may be applied irrespective of its type as long as it is a communication network capable of connecting the switch device 130, the measuring device 140 and the server 150. Accordingly, the network 170 may be any one or more of the Internet, an intranet, an optical communication network, and a mobile network.

Meanwhile, the base station signal monitoring system 100 illustrated in FIG. 1 illustrates an example of application to an optical transport network, which is a sub-network constituting a fronthaul segment of a radio access network architecture, but the inventive concept of the present disclosure is not limited thereto. It is apparent that the inventive concept of the present disclosure may be applied to a midhaul and a backhaul segment of the radio access network architecture, and further to an optical transmission network such as FTTx solution and in-building solution.

Hereinafter, the operation of each component of the base station signal monitoring system 100 according to an embodiment will be described in more detail.

First, the COTs 110-1 to 110-$n$ (hereinafter collectively referred to as '110') may be devices that multiplex a base station signal and transmit the base station signal to one or more connected RTs (at least one of 120-1 to 120-$n$). For example, the COT 110 may receive m base station signals (m is a natural number) from a DU (not shown) and convert the m base station signals into WDM signals. In addition, the COT 110 may transmit the WDM signals to the one or more connected RTs (at least one of 120-1 to 120-$n$) through an optical cable. That is, the COT 110 may receive m base station signals and convert them into optical signals of different wavelengths, and may transmit the optical signals to one or more RTs (at least one of 120-1 to 120-$n$). Meanwhile, the base station signal may be a baseband signal conforming to the standard of a fronthaul link such as Common Public Radio Interface (CPRI), Open Base Station Architecture Initiative (OBSAD, and Open Radio Equipment Interface (ORI).

The COT 110 may transmit m base station signals to the switch device 130.

Referring further to FIG. 2, the COT 110 according to an embodiment may include m to signal processors 210-1 to 210-$m$, m laser modules 220-1 to 220-$m$, and a multiplexer (MUX) 230.

Each of them signal processors (hereinafter collectively referred to as '210') may process a base station signal received from a DU (not shown). The signal processor 210 may receive a base station signal, convert the base station signal in serial and parallel, and output the base station signal, and may include a known configuration such as small form factor pluggable (SFP), a serializer, an FPGA, and a serializer/parallelizer (SerDes).

Each of the m laser modules (hereinafter collectively referred to as 220) may generate an optical signal having a corresponding wavelength with the base station signal output from the signal processor 210. For example, the laser module 220 may output an optical signal $\lambda_1$ of a first wavelength to an optical signal $\lambda_m$ of an $m^{th}$ wavelength as the base station signals, the laser module 220 may include a known configuration such as a laser diode or a laser controller.

Optical signals generated by the m laser modules 220 may be multiplexed through the MUX 230 and transmitted to at least one of the RTs 120-1 to 120-$n$.

Meanwhile, the base station signal output from each signal processor 210 may be duplicated or branched and transmitted to the switch device 130. For example, signals output from each signal processor 210 may be tapped through T-Drop and transmitted to the switch device 130.

In FIG. 2, base station signals (i.e., base station signals before being input to each laser module 220) output from each signal processor 210 are described on the assumption that the base station signals are transmitted to the switch device 130, but base station signals (i.e., optical signals) output from each laser module 220 may be transmitted to the switch device 130.

Referring back to FIG. 1, RTs 120-1 to 120-$n$ (hereinafter collectively referred to as '120') are devices located on a cell site side. The RT 120 is connected to the COT 110 and may transmit a base station signal received from the COT 110 to an RU (not shown).

The switch device 130 may switch base station signals received from the n connected COTs 110.

Referring further to FIG. 3, the switch device 130 may include an input port 310, an output port 320, a switch 330, a communication modem 340, and a switch controller 350.

The input port 310 may be a component for connection with one or more optical transmission devices ((e.g., the COT 110, etc.)). The input port 310 may receive base station to signals from the connected optical transmission device. For example, the input port 310 may be a communication port to which an optical cable may be connected.

The output port 320 may be a component for connection with the measuring device 140 and/or the server 150 through one or more optical transmission devices (e.g., COT 110, etc.) and the network 170. The output port 320 may output base station signals received through the input port 310 to the connected optical transmission device, and may transmit the base station signals to the measuring device 140 and/or the server 150 through the network 170. For example, the output port 320 may also be a communication port to which an optical cable may be connected.

The switch 330 may be configured to switch the connection between the input port 310 and the output port 320. The switch 330 may perform a switching operation according to the control of the switch controller 350. The input port 310 and the output port 320 may be connected to each other to correspond to the previously stored connection information. The connection information is information about a connection relationship between the input port 310 and the output port 320, and may be information stored in a storage space (not shown) that is previously set and provided. For example, assuming that each of the input port 310 and the output port 320 is composed of three ports, the connection information may include related information such that the first input port is connected to the first output port, the second input port is connected to the second output port, and the third input port is connected to the third output port. In the above example, it is assumed that the number of input ports 310 and the number of output ports 320 are the same, but it is obvious that the number of ports may be different.

The switch 330 may be applied irrespective of its type as long as the connection between the input port 310 and the output port 320 may be reset, so that not only a crosspoint switch but also a packet switch may be applied.

The communication modem 340 is a component capable of accessing the network 170, and the switch device 130 may transmit and receive data to and from the measuring device 140 and/or the server 150 by the communication modem 340.

The switch controller 350 may be a component that controls all operations of the switch device 130. The switch controller 350 may control the connection between the input port 310 and the output port 320 to be changed. For example, when an administrator manipulates the server 150 to transmit information for changing a connection state between the input port 310 and the output port 320 (hereinafter referred to as "change information"), the connection state may be changed accordingly. In more detail, the server 150 may transmit the generated change information to the communication modem 340 through the network 170, and the communication modem 340 may output the change information to the switch controller 350. The switch controller 350 may analyze the change information and control the switch 330 according to the analysis result to change the connection between the input port 310 and the output port 320 to correspond to the change information. For example, the change information, unlike the connection relationship between each of three input ports and three output ports set in advance in the example described above, may include information for connecting a first input port to a third output port and for connecting a third input port to a first output port.

The switch device 130 may detect a base station signal corresponding to a request from an administrator, among a plurality of received base station signals, and may transmit the base station signal to the measuring device 140 and/or the server 150.

The administrator or the like may transmit information requesting transmission of any one of m base station signals input to the switch device 130 (hereinafter referred to as 'base station signal transmission request') to the communication modem 340. The base station signal transmission request may be generated by the measuring device 140 by the administrator's operation of the measuring device 140 or by the server 150 according to the administrator's operation of the server 150, and then transmitted to the communication modem 340. When the base station signal transmission request is received, the communication modem 340 may output the base station signal transmission request to the switch controller 350.

When the base station signal transmission request is received, the switch controller 350 may transmit a portion or all of a base station signal corresponding to the base station signal transmission request to the measuring device 140 and/or the server 150.

It is assumed that the base station signal corresponding to the base station signal transmission request is a first base station signal. At this time, the switch controller 350 may control the switch 330 so that the first base station signal input to the switch 330 is transmitted to the measuring device 140. Under the control of the switch controller 350, the switch 330 may connect the input port 310, to which the first base station signal is input, to the output port 320 connected to the measuring device 140.

Alternatively, when the base station signal transmission request is received, the switch controller 350 may duplicate a base station signal corresponding to the base station signal transmission request and may transmit the duplicated base station signal to the measuring device 140 and/or the server 150.

It is assumed that the base station signal corresponding to the base station signal transmission request is the first base station signal. At this time, the switch controller 350 may control the switch 330 so that the first base station signal input to the switch 330 is at least partially duplicated. In this case, the switch 330 may include a configuration capable of at least partially duplicating the input signal. In addition, under the control of the switch controller 350, the switch 330 may output the duplicated first base station signal to the output port 320 connected to the measuring device 140.

According to an embodiment, the switch controller 350 may control the switch 330 so that the switch 330 outputs the duplicated first base station signal to the communication modem 340, and may control the communication modem 340 so that the communication modem 340 transmits the duplicated first base station signal to the measuring device 140 and/or the server 150.

Referring back to FIG. 1, the measuring device 140 may receive a base station signal from the switch device 130 (i.e., a portion/all of a base station signal transmitted from the switch device 130 in response to the base station signal transmission request or a duplicate signal). The measuring device 140 may measure the received base station signal to determine the quality of the base station signal. The configuration and operation of measuring the base station signal by the measuring device 140 are obvious to one of ordinary skill in the art, and thus a detailed description thereof will not be given herein.

The server 150 may manage/control and monitor the measuring device 140 connected through the network 170. For example, the server 150 may transmit a base station signal transmission request to the measuring device 140 so that the measuring device 140 may receive and measure a base station signal. For another example, the server 150 may receive information about a measurement result of a base station signal from the measuring device 140 and then manage the information. That is, the server 150 may receive the measurement result from the measuring device 140 and determine whether the base station signal is normally transmitted/received.

The server 150 may directly receive a base station signal from the switch device 130 connected through the network 170 and measure the received base station signal to determine whether normal transmission/reception is performed.

In addition, the server 150 may generate change information corresponding to the administrator's operation. The server 150 may transmit the generated change information to the switch device 130 through the network 170 to control the switch device 130 to change the connection between the input port 310 and the output port 320.

Figure 4:
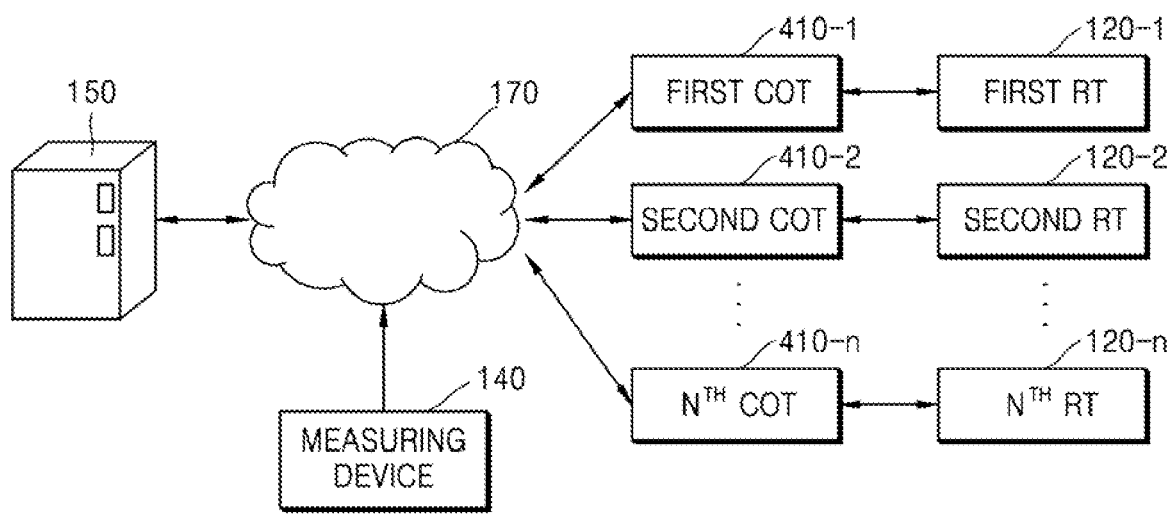
FIG. 4 is a configuration diagram of a base station signal monitoring system according to another embodiment.
Figure 5:
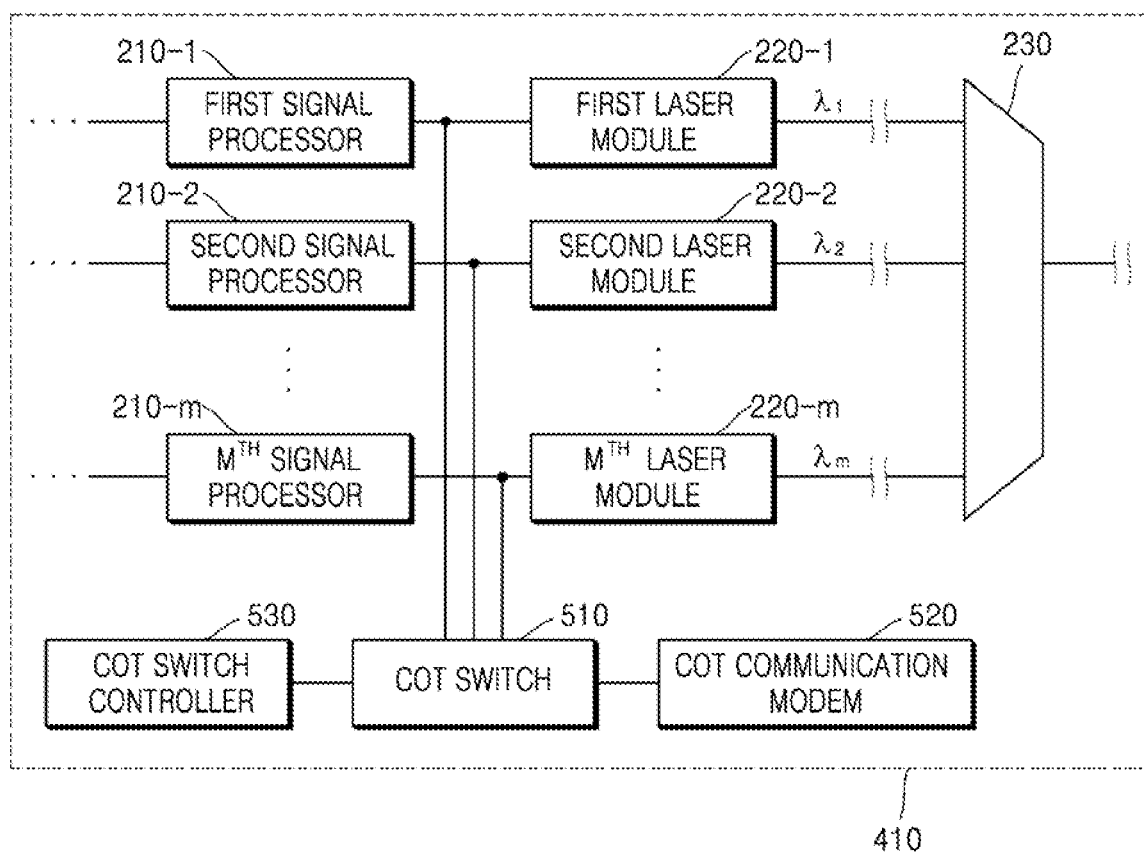
FIG. 5 is a block diagram of an optical transmission device according to another embodiment.

FIG. 4 is a configuration diagram of a base station signal monitoring system according to another embodiment, and FIG. 5 is a block diagram of an optical transmission device according to another embodiment.

A base station signal monitoring system 400 according to another embodiment illustrated in FIG. 4 is different from the base station signal monitoring system 100 illustrated in FIG. 1 in that the switch device 130 is not included. That is, the switch device 130 is not separately included in the base station signal monitoring system 400 according to another embodiment, and components for performing the function of the switch device 130 are included in each of the COTs 410-1 to 410-n (hereinafter collectively referred to as '410').

Referring to FIG. 5, the COT 410 may include a COT switch 510, a COT communication modem 520, and a COT switch controller 530. The COT switch 510, the COT communication modem 520, and the COT switch controller 530 are similar to the functions of the switch 330, the communication modem 340, and the switch controller 350 of the switch device 130 of FIG. 3.

That is, the COT switch 510 may connect m signal processors 210-1 to 210-m tom laser modules 220-1 to 220-m to correspond to connection information previously stored in a provided storage space (not shown). The connection information in this example, which is about a connection relationship between the m signal processors 210-1 to 210-m and the m laser modules 220-1 to 220-m, may be information stored in the storage space (not shown) that is previously set and provided. The connection information may include related information so that the first signal processor 210-1 is connected to the first laser module 220-1, the second signal processor 210-2 is connected to the second laser module 220-2, and the third signal processor 210-3 is connected to the third laser module 220-3. In addition, it is similar to the above that the connection information may be changed by change information later.

In addition, the COT communication modem 520 is a configuration capable of accessing the network 170, and by the COT communication modem 520, the COT switch device 510 may receive data such as change information from the measuring device 140 and/or the server 150, and may transmit a base station signal or the like to the measuring device 140 and/or the server 150.

The COT switch controller 530 may control the connection of the m signal processors 210-1 to 210-m and them laser modules 220-1 to 220-m to be changed. This operation may be the same as or similar to the method described for the change information with reference to FIG. 3, and thus, a detailed description thereof will not be given herein.

In addition, the measuring device 140 may generate information for requesting transmission of any one of m base station signals input to the COT 110 (hereinafter referred to as 'base station signal transmission request') and transmit the information to the COT communication modem 520. When a base station signal transmission request is received, the COT communication modem 520 may output the base station signal transmission request to the COT switch controller 530.

When the base station signal transmission request is received, the COT switch controller 530 may transmit a portion or all of a base station signal corresponding to the base station signal transmission request to the measuring device 140.

It is assumed that a base station signal corresponding to the base station signal transmission request is the first base station signal (i.e., a base station signal output from the first signal processor 210-1). The COT switch controller 530 may control the COT switch 510 so that the first base station signal input to the COT switch 510 is transmitted to the measuring device 140.

The COT switch 510 may duplicate the first base station signal under the control of the COT switch controller 530 and output the first base station signal to the COT communication modem 520, and the COT communication modem 520 may transmit the first base station signal to the measuring device 140.

Alternatively, base station signals input to the COT switch 510 may be signals input to the COT switch 510 by being partially coupled after being respectively output from the signal processors 210-1 to 210-m, and the COT switch 510 may transmit a base station signal corresponding to the base station signal transmission request to the measuring device 140 under the control of the COT switch controller 530.

As described above, the base station signal monitoring systems 100 and 400 according to an embodiment include the switch devices 130 and 510 capable of switching by receiving base station signals from an optical transmission device (e.g., COT, etc.), and the measuring device 140 may remotely receive a base station signal from the optical transmission devices 110, 410, etc. through the switch devices 130 and 510 and analyze the quality of the signal. Accordingly, according to the present disclosure, it is possible to remotely monitor a base station signal without an administrator's visit.

While the embodiments have been particularly shown and described, it will be understood by one of ordinary skill in the art that various changes in form and details may be made therein without departing from the spirit and scope of the disclosure as defined by the appended claims.

The invention claimed is:

1. A base station signal monitoring system comprising:
a plurality of optical transmission devices configured to transmit an optical signal carrying a base station signal;
a measuring device configured to measure the base station signal according to a preset method; and
a switch device connected to the plurality of optical transmission devices and the measuring device, and configured to switch connections between a plurality of input ports and a plurality of output ports so that the base station signal is transmitted from one of the plurality of optical transmission devices to the measuring device when a base station signal transmission request is received from the measuring device.

2. The base station signal monitoring system of claim 1, wherein the switch device receives the base station signal transmission request from the measuring device, switches the connections between the plurality of input ports and the plurality of output ports to transmit at least a portion of a base station signal corresponding to the base station signal transmission request to the measuring device.

3. The base station signal monitoring system of claim 1, wherein the switch device receives the base station signal transmission request from the measuring device, duplicates at least a portion of a base station signal corresponding to the base station signal transmission request, and transmits the duplicated base station signal to the measuring device.

4. The base station signal monitoring system of claim 1, further comprising:
a server, which is connected to the switch device, configured to transmit change information for changing a connection state between the plurality of input ports and the plurality of output ports to the switch device,
wherein the switch device controls the connections between the plurality of input ports and the plurality of output ports to correspond to the change information.

5. A switch device comprising:
a plurality of input ports respectively connected to a plurality of optical transmission devices;
a plurality of output ports each connected to any one of the plurality of optical transmission devices and a measuring device;
a switch configured to switch connections between the plurality of input ports and the plurality of output ports so that an optical signal carrying a base station signal is transmitted from one of the plurality of optical transmission devices to another of the plurality of optical transmission devices or the measuring device; and a switch controller configured to control the switch to correspond to preset connection information, wherein the switch controller is configured to control the switch so that the base station signal is transmitted from the one of the plurality of optical transmission devices to the measuring device when a base station signal transmission request is received from the measuring device.

6. The switch device of claim 5, further comprising:
a communication modem receiving the base station signal transmission request from the measuring device,
wherein the switch controller controls the switch so that at least a portion of a base station signal corresponding to the base station signal transmission request is transmitted to the measuring device.

7. The switch device of claim 5, further comprising:
a communication modem receiving the base station signal transmission request from the measuring device,
wherein the switch controller duplicates at least a portion of a base station signal corresponding to the base station signal transmission request, and controls at least one of the switch and the communication modem so that the duplicated portion of the base station signal is transmitted to the measuring device.

8. The switch device of claim 5, further comprising:
a communication modem receiving change information for changing a connection state between the plurality of input ports and the plurality of output ports from a connected server,
wherein the switch controller controls the switch to correspond to the change information.

9. An optical transmission device comprising:
a plurality of signal processors respectively processing a plurality of base station signals according to a preset method;
a plurality of laser modules, which are respectively connected to the plurality of signal processors, configured to respectively convert the plurality of base station signals output from the plurality of signal processors into optical signals;
a switch configured to switch the connections between the plurality of signal processors and the plurality of laser modules so that each of the plurality of base station signals is input to a corresponding laser module from among the plurality of laser modules; and
a switch controller configured to control the switch to correspond to preset connection information,
wherein the switch is connected to a measuring device, and
wherein when a base station signal transmission request is received from the measuring device, the switch controller is configured to control the switch to transmit one of the plurality of base station signals corresponding to the base station signal transmission request to the measuring device.

10. The optical transmission device of claim 9, further comprising:
a communication modem receiving the base station signal transmission request from the measuring device,
wherein the switch controller controls the switch so that at least a portion of a base station signal corresponding to the base station signal transmission request from among the plurality of base station signals is transmitted to the measuring device.

11. The switch device of claim 9, further comprising:
a communication modem receiving the base station signal transmission request from the measuring device,
wherein the switch controller duplicates at least a portion of a base station signal corresponding to the base station signal transmission request from among the plurality of base station signals, and controls at least one of the switch and the communication modem so that the duplicated portion of the base station signal is transmitted to the measuring device.

12. The optical transmission device of claim 9, further comprising:
a communication modem receiving change information for changing a connection state between the plurality of input ports and the plurality of output ports from a connected server,
wherein the switch controller controls the switch to correspond to the change information.

* * * * *